No. 735,218. Patented August 4, 1903.

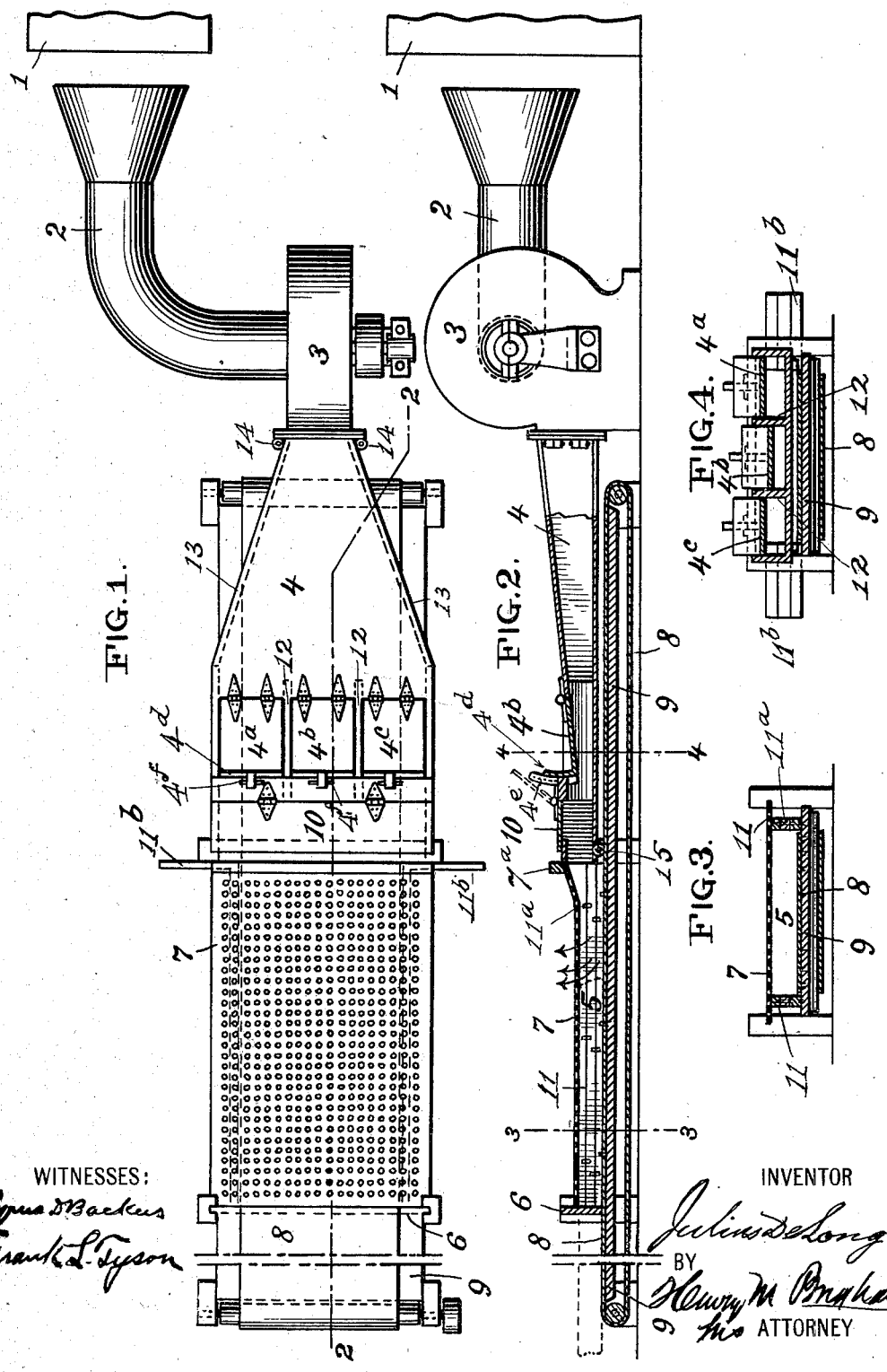

UNITED STATES PATENT OFFICE.

JULIUS DE LONG, OF BROOKLYN, NEW YORK.

PROCESS OF PRODUCING MATS OR BATS OF FIBROUS MATERIAL.

SPECIFICATION forming part of Letters Patent No. 735,218, dated August 4, 1903.

Application filed August 2, 1901. Serial No. 70,666. (No specimens.)

*To all whom it may concern:*

Be it known that I, JULIUS DE LONG, a citizen of the United States, and a resident of Brooklyn, in the city and State of New York, have invented a certain new and useful Process for Producing Mats or Bats of Fibrous Material, of which the following is a specification.

The object of my invention is to produce a mat or bat of fibrous material of any desired shape, size, or contour in cross-section and of any desired length; and with this object in view my invention consists in a process of forming mats or bats of fibrous material by injecting a fiber-laden blast of air into a forming or molding chamber the walls of which are constructed to produce a mat or bat of the desired size, shape, or contour in cross-section and preferably continuously delivering or discharging from such forming and molding chamber the mat or bat as it is produced.

By my improved process the disintegrated fiber is carried and forced by a blast of air into the forming or molding chamber, into which it is packed or molded and is first forced and packed against a removable door in the end of such forming or molding chamber and subsequently against the end or one edge of the mat or bat itself which is in process of formation, so that the disintegrated fiber is packed and molded into the chamber or mold, the walls of which determine the size of the mat or bat and impart to it any desired shape or contour in cross-section. During the operation the air is allowed to escape through suitable perforations in the walls of the forming and molding chamber.

By my process a mat or bat of any desired size and form in cross-section is produced which is more uniform in its density than is attainable by any apparatus or process heretofore in use for the production of mats or bats of fibrous material.

In my application, Serial No. 38,876, filed the 6th of December, 1900, I have shown and described various forms of apparatus suitable for use in carrying my novel process into effect.

While various forms and construction of apparatus may be employed for the purpose, I have shown in the drawings forming part of the present application a simple apparatus suitable for the purpose, in which—

Figure 1 is plan view of a simple apparatus suitable for the purpose. Fig. 2 is a longitudinal vertical section of the same on the line 2 2 of Fig. 1. Fig. 3 is a transverse section on the line 3 3. Fig. 4 is a transverse section on the line 4 4.

Cotton, hair, or other fiber thoroughly disintegrated is taken from a suitable picker 1 or other source of supply through a feed or conductor pipe 2 by a blower 3 and delivered into a condensing-chamber 4 and by means of any desirable number of variable dampers $4^a$ $4^b$ $4^c$ is equalized and spread out into a broad flat stream which is so regulated by such variable dampers that the same amount of fiber will be delivered with the same air-pressure to each part of the forming and molding chamber 5. After reaching the forming and molding chamber 5 the current of air conducting the fiber passes forward until it reaches the obstruction plate or door 6, by which its flow is arrested, the air escaping through the perforations in the plate 7, which are of such size that they permit the air to escape freely and yet retain the fiber within the chamber.

In the drawings I have shown the perforations in the top only of the batting and molding chamber. They may, however, be placed in any or all of the walls of said chamber, their object being to permit the escape of air and yet retain the fiber within the chamber, or one or more of the walls of the batting-chamber or a portion of one of such walls may be made of wire or other suitable netting as a mechanical equivalent of perforations shown in plate 7, which will likewise permit the escape of the air and yet retain the fiber. After the fiber has been deposited in a sufficient quantity to form an obstruction to the air-current the plate or door 6 is removed, permitting the bat of fiber deposited in the chamber to be carried forward by the movement of an endless apron 8, passing over the bed 9, forming the bottom wall of the chamber 5, and extending back beneath the chamber 4.

One or more valve-doors 10 are placed in the chamber 4 to provide for the escape of air under excessive pressure or in case the movement of the apron 8 or passage of the bat or mat in chamber 5 has been stopped, or if the deposit of fiber in the chamber 5 becomes so great as to check the free passage or flow through the perforations.

The side walls of the chamber 5 are made up of a number of strips 11, provided with pins 11$^a$ to provide for adjustment for different thicknesses of the deposit. The strips 11 are placed in different positions on the bed 9 to provide for different widths of the bat and are provided with right-angled extensions 11$^b$ to close the opening between the strips and the side walls of the chamber 4. Different widths of aprons 8 are introduced to suit the adjusted width between the strips 11.

The plate 7 is provided with an upward extension 7$^a$ to close the opening between the said plate and the top of the chamber 4 when the plate 7 is lowered for different thicknesses of mat.

The chamber 4 is provided with longitudinal partitions 12 to form the side walls, between which the dampers 4$^a$ 4$^b$ 4$^c$ work, and a portion 13 of the side wall of the chamber 4 is hinged at 14, so as to be swung in to the partitions 12, when the strips 11 in the chamber 5 are adjusted to a corresponding position. The dampers 4$^a$, 4$^b$, and 4$^c$ are also adjustable to regulate the volume of air and fiber.

The several dampers 4$^a$ 4$^b$ 4$^c$ are formed with upwardly-projecting wings 4$^d$ to maintain the closure of the joint between them and the top of the casing, when they are adjusted downward and with suitable means, such as perforated bars 4$^e$ and pins 4$^f$, to fix them at any angle of adjustment.

15 represents a roller, preferably of yielding material, mounted on journals in the side walls and between the bed 9 and the bottom of the chamber 4 for the purpose of closing the throat or space between these parts to prevent the escape of air therethrough.

Various details in the construction of the apparatus which may be employed are shown and described in my application, Serial No. 38,876, herein referred to.

Other forms of apparatus may be used in carrying out the process, which consists, essentially, in forming mats or bats of fibrous material in a molding-chamber by means of an air-blast by which disintegrated fibrous matter is carried and delivered to the mat or bat in process of formation.

The process may be carried on intermittingly in a closable forming and molding chamber, the door constituting the end of such chamber, against which the fibrous matter carried by the blast is projected by its momentum and the momentum and pressure of the air, and such door being opened for the delivery and removal of each section of mat or bat so formed. Preferably, however, the process is carried on continuously, as above described, so that the door at the end of the chamber is used only at the beginning of the operation, after which the end of the mat or bat in process of formation itself constitutes the obstruction against which the fibrous matter is projected and packed and molded by momentum and air-pressure. By this means any break in the mat or bat is avoided, and a continuous mat or bat is produced of indefinite length and of great homogeneity or uniformity in structure.

The invention is well adapted for the production of felt mats of indefinite length from hair, wool, fur, or other animal fiber or for producing a bat of indefinite length from cotton or other vegetable fiber.

The invention is also adapted for the construction of mattresses or other similar articles.

I am aware that it is old to employ a room, box, chamber, or receptacle which acts as a settling-chamber into which the fiber is introduced by means of an air-blast and made to settle by gravity upon the floor thereof, and I make no claim to any process which involves the use of any such room, box, chamber, or receptacle, it being characteristic of my process, as hereinbefore described, that the mat or bat has its shape and dimensions controlled and determined by the walls of the molding-chamber to the extent and in the manner herein described.

Having thus described my invention, the following is what I claim as new therein and desire to secure by Letters Patent:

1. The process of producing mats or bats of fibrous material, which consists in forcing a fiber-laden current of air into a molding-chamber and packing and molding the fibrous material in said chamber, by the pressure and momentum of the injected air and fiber, substantially as set forth.

2. The process of producing mats or bats of fibrous material, which consists in forcing a fiber-laden current of air into a molding-chamber and packing and molding the fibrous material in said chamber by means of the current of air, while permitting the air to escape, substantially as set forth.

3. The process of producing mats or bats of fibrous material, which consists in forcing a fiber-laden current of air into a molding-chamber and packing and molding the fibrous material in such chamber by the pressure and momentum of the injected air and fiber and varying the density of the fibrous bat by regulating the force of the current of air, substantially as set forth.

4. The process of producing fibrous mats or bats of any desired length which consists in conveying disintegrated fiber by a current of air into a mold and utilizing the force of the air-current to pack and mold the fiber against one end of the molded mat or bat, and discharging the bat or mat from the mold as it is formed therein, substantially as set forth.

5. The process of producing a continuous length of fibrous mat or bat which consists in continuously conveying disintegrated fiber by a current of air into a mold and compressing and molding the fiber therein by the pressure of air and continuously discharging the molded and compressed bat from the mold, substantially as set forth.

Signed at New York city, in the county of New York and State of New York, this 8th day of July, A. D. 1901.

JULIUS DE LONG.

Witnesses:
WILLARD N. BAYLIS,
CYRUS D. BACKUS.